United States Patent
Chen

(10) Patent No.: US 9,442,502 B2
(45) Date of Patent: Sep. 13, 2016

(54) VOLTAGE REGULATOR WITH SOFT-START CIRCUIT

(71) Applicant: FARADAY TECHNOLOGY CORPORATION, Hsinchu (TW)

(72) Inventor: Chi-Yang Chen, Tainan (TW)

(73) Assignee: Faraday Technology Corp., Hsin-Chu (TW)

( * ) Notice: Subject to any disclaimer, the term of this patent is extended or adjusted under 35 U.S.C. 154(b) by 90 days.

(21) Appl. No.: 14/626,493

(22) Filed: Feb. 19, 2015

(65) Prior Publication Data

US 2016/0116927 A1 Apr. 28, 2016

(30) Foreign Application Priority Data

Oct. 23, 2014 (TW) .............................. 103136605 A

(51) Int. Cl.
*G05F 1/575* (2006.01)
*H02M 1/36* (2007.01)

(52) U.S. Cl.
CPC ................ *G05F 1/575* (2013.01); *H02M 1/36* (2013.01); *Y10S 323/901* (2013.01)

(58) Field of Classification Search
CPC ..... H02M 1/36; Y10S 323/901; G05F 1/575
See application file for complete search history.

(56) References Cited

U.S. PATENT DOCUMENTS

| | | | |
|---|---|---|---|
| 6,969,977 B1 | 11/2005 | Smith | |
| 7,459,891 B2 | 12/2008 | Al-Shyoukh et al. | |
| 7,619,397 B2 | 11/2009 | Al-Shyoukh | |
| 8,704,506 B2 | 4/2014 | Lipka et al. | |
| 2006/0261797 A1* | 11/2006 | Man | G05F 1/575 323/314 |
| 2007/0053115 A1* | 3/2007 | Tain | G05F 1/575 361/18 |
| 2007/0290666 A1* | 12/2007 | Hachiya | H02M 3/156 323/282 |
| 2008/0169795 A1* | 7/2008 | Wang | G05F 1/575 323/280 |
| 2008/0284394 A1* | 11/2008 | Yin | G05F 1/575 323/282 |
| 2009/0128107 A1* | 5/2009 | Wang | G05F 1/575 323/280 |
| 2013/0162233 A1* | 6/2013 | Marty | H02M 3/158 323/274 |
| 2013/0234694 A1* | 9/2013 | Chang | G05F 3/02 323/313 |

* cited by examiner

*Primary Examiner* — Jessica Han
*Assistant Examiner* — Demetries A Gibson
(74) *Attorney, Agent, or Firm* — Winston Hsu; Scott Margo

(57) ABSTRACT

A voltage regulator includes an operational amplifier, a transistor, a first resistor, a second resistor, an output voltage delaying circuit and a selecting circuit. The output voltage delaying circuit receives an output voltage and generates a delayed output voltage. A first input terminal of the selecting circuit receives a reference voltage. A second input terminal of the selecting circuit receives the delayed output voltage. An output terminal of the selecting circuit generates a control voltage to a first input terminal of the operational amplifier. If the reference voltage is larger than the delayed output voltage, the selecting circuit selects the delayed output voltage as the control voltage. If the reference voltage is smaller than the delayed output voltage, the selecting circuit selects the reference voltage as the control voltage.

10 Claims, 5 Drawing Sheets

US 9,442,502 B2

VOLTAGE REGULATOR WITH SOFT-START CIRCUIT

This application claims the benefit of Taiwan Patent Application No. 103136605, filed Oct. 23, 2014, the subject matter of which is incorporated herein by reference.

FIELD OF THE INVENTION

The present invention relates to a voltage regulator, and more particularly to a voltage regulator with a soft-start circuit.

BACKGROUND OF THE INVENTION

FIG. 1A is a schematic circuit diagram illustrating a conventional voltage regulator. FIG. 1B is a schematic timing waveform diagram illustrating associated signals processed by the conventional voltage regulator of FIG. 1A. The conventional voltage regulator 100 is a low dropout voltage regulator (also referred as a LDO voltage regulator). The voltage regulator 100 comprises a reference voltage source, a transistor MP, an operational amplifier OP, a first resistor R1 and a second resistor R2.

The operational amplifier OP is controlled according to an enabling signal EN. A negative input terminal of the operational amplifier OP receives a reference voltage Vref from the reference voltage source. A positive input terminal of the operational amplifier OP receives a feedback voltage Vfb. An output terminal of the operational amplifier OP generates an error signal Ve. The gate terminal of the transistor MP is connected to the output terminal of the operational amplifier OP. The source terminal of the transistor MP is connected to a power supply voltage Vcc. The drain terminal of the transistor MP is connected to an output terminal O of the voltage regulator 100. Moreover, a first terminal of the first resistor R1 is connected to the drain terminal of the transistor MP, and a second terminal of the first resistor R1 is connected to a node "a". A first terminal of the second resistor R2 is connected to the node "a", and a second terminal of the second resistor R2 is connected to a ground voltage GND. Moreover, the feedback voltage Vfb is outputted from the node "a", and the node "a" is connected to the positive input terminal of the operational amplifier OP.

The output terminal O of the voltage regulator 100 is connected to a bulk capacitor Cb and a load 110. While the voltage regulator 100 is normally operated, the transistor MP is controlled to generate an output voltage Vout according to the error signal Ve. Moreover, the output voltage Vout from the voltage regulator 100 is stabilized by the bulk capacitor Cb. Consequently, the output terminal O of the voltage regulator 100 generates an output current Io to the load 110. Under this circumstance, the output voltage Vout may be expressed by the following formula: Vout=(1+R1/R2)×Vref.

However, since the capacitance value of the bulk capacitor Cb is very large, the magnitude of the output current Io from the output terminal O of the voltage regulator 100 is very large during the transient period of starting up the voltage regulator 100. Consequently, the load 110 or the transistor MP is possibly burnt out. Hereinafter, the relationships between the output voltage Vout and the output current Io of the voltage regulator 100 in some situations will be described in more details.

Please refer to FIG. 1B. At the time point t1, the voltage regulator 100 is started. The high level state of the enabling signal EN indicates that the operational amplifier OP is in a normal working state. Consequently, the power supply voltage Vcc increases at a ramp rate. Obviously, during the period of increasing the power supply voltage Vcc, an overshoot phenomenon 120 of the output voltage Vout occurs and the output current Io is unstable.

At the time point t2, the power supply voltage Vcc is in the steady state (e.g. 3.3V), and the enabling signal EN is switched from a low level state to the high level state. Obviously, during the transient period of enabling the operational amplifier OP, an overshoot phenomenon 122 of the output voltage Vout occurs and the output current Io is a rush current. The rush current is larger than 2 A (2000 mA). Consequently, the load 110 or the transistor MP is possibly burnt out by the output current Io.

At the time point t3, the enabling signal EN is in the high level state. Consequently, the power supply voltage Vcc quickly increases from 0V to 3.3V. Obviously, during the transient period of starting up the voltage regulator 100, an overshoot phenomenon 124 of the output voltage Vout occurs and the output current Io is a rush current. The rush current is larger than 0.5 A (500 mA). Consequently, the load 110 or the transistor MP is possibly burnt out by the output current Io.

Generally, during the transient period of starting up the voltage regulator 100, the voltage difference between the two input terminals of the operational amplifier OP is very large. Consequently, the magnitude of the output current Io from the transistor MP is too large and the output voltage Vout has the overshoot phenomenon.

For avoiding the generation of the rush current during the transient period of starting up the voltage regulator 100, some soft-start circuits have been disclosed in for example U.S. Pat. No. 8,704,506, U.S. Pat. No. 7,459,891, U.S. Pat. No. 7,619,397 and U.S. Pat. No. 6,969,977. The soft-start circuit is applied to the voltage regulator to reduce the possibility of generating the rush current during the transient period of starting up the voltage regulator.

SUMMARY OF THE INVENTION

The present invention provides a voltage regulator with a soft-start circuit. The soft-start circuit has a simple circuitry configuration and is capable of effectively avoiding the rush current and the overshoot phenomenon of the output voltage.

An embodiment of the present invention provides a voltage regulator. The voltage regulator includes an operational amplifier, a transistor, a first resistor, a second resistor, an output voltage delaying circuit and a selecting circuit. A first input terminal of the operational amplifier receives a control voltage. A second input terminal of the operational amplifier receives a feedback voltage. An output terminal of the operational amplifier generates an error signal. A gate terminal of the transistor is connected to the output terminal of the operational amplifier and receives the error signal. A first terminal of the transistor receives a power supply voltage. A second terminal of the transistor is connected to an output terminal of the voltage regulator. The output terminal of the voltage regulator generates an output voltage. A first terminal of the first resistor is connected to the output terminal of the voltage regulator. A second terminal of the first resistor is connected to the second input terminal of the operational amplifier. A first terminal of the second resistor is connected to the second terminal of the first resistor and generates the feedback voltage. A second terminal of the second resistor is connected to a ground voltage. The output voltage delaying circuit is connected to the output terminal of the voltage regulator. The output voltage delaying circuit receives the output voltage and generates a delayed output voltage. A first input terminal of the selecting circuit receives a reference voltage. A second input terminal of the selecting circuit receives the delayed output voltage. An output terminal of the selecting circuit generates the control voltage to the first input terminal of the operational amplifier. If the reference voltage is larger than the delayed output voltage, the selecting circuit selects the delayed output voltage as the control voltage. If the reference voltage is smaller than the delayed output voltage, the selecting circuit selects the reference voltage as the control voltage.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
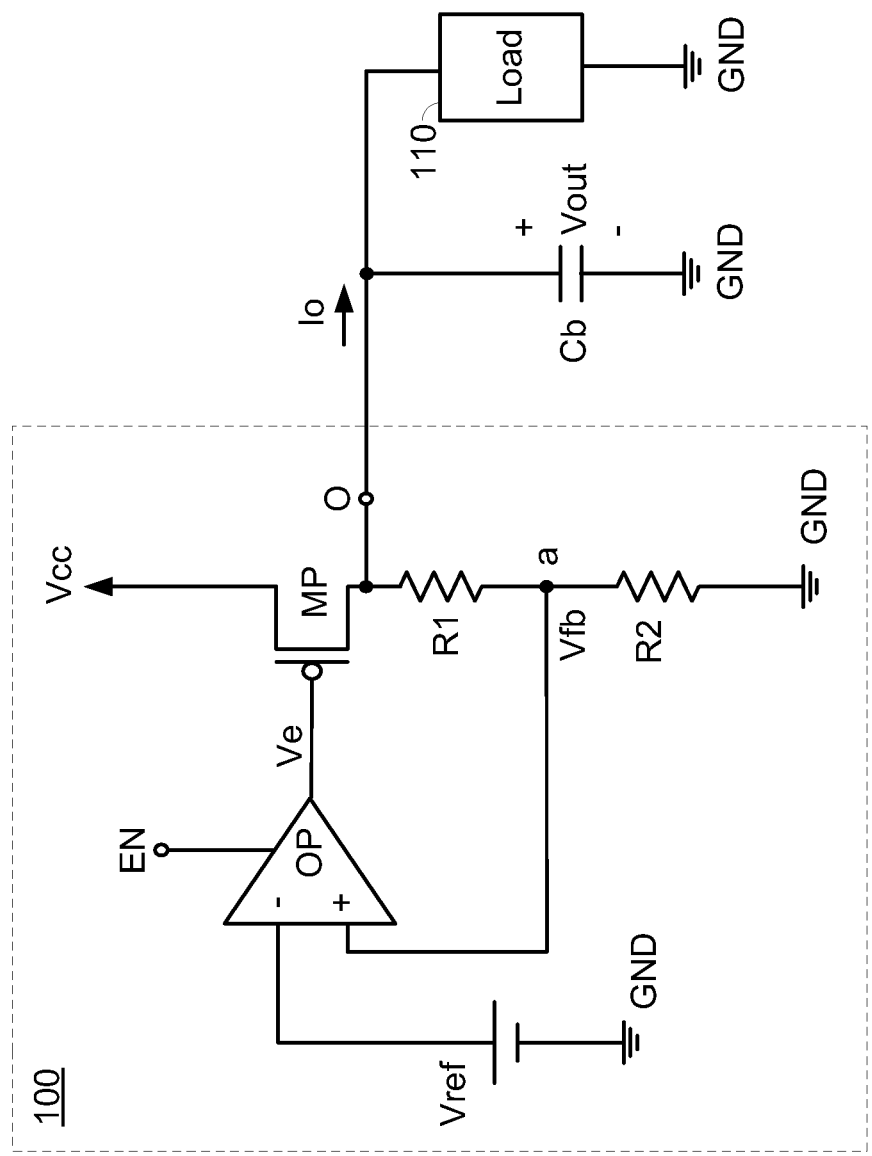
FIG. 1A (prior art) is a schematic circuit diagram illustrating a conventional voltage regulator.
Figure 1B:
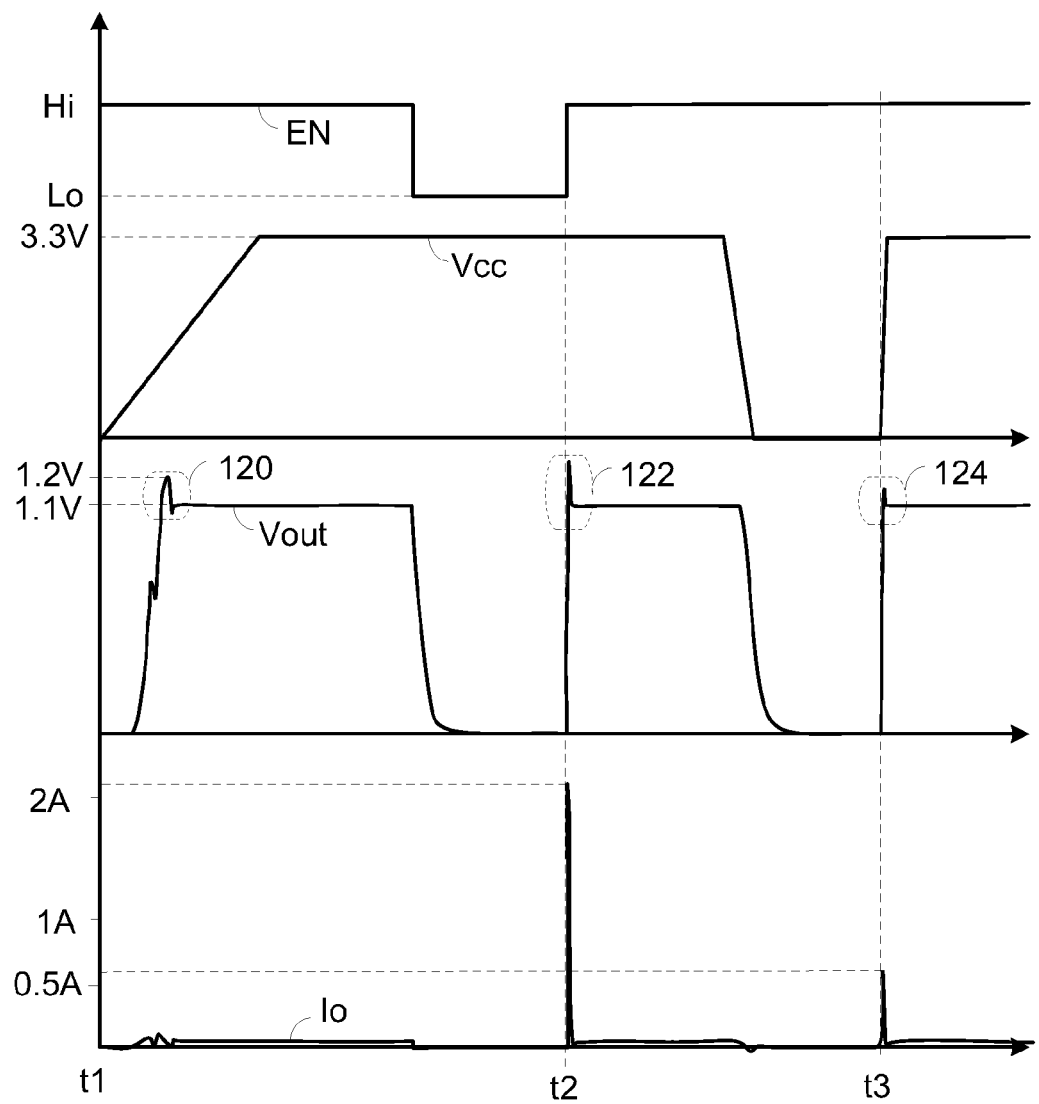
FIG. 1B (prior art) is a schematic timing waveform diagram illustrating associated signals processed by the conventional voltage regulator of FIG. 1A.
Figure 2A:
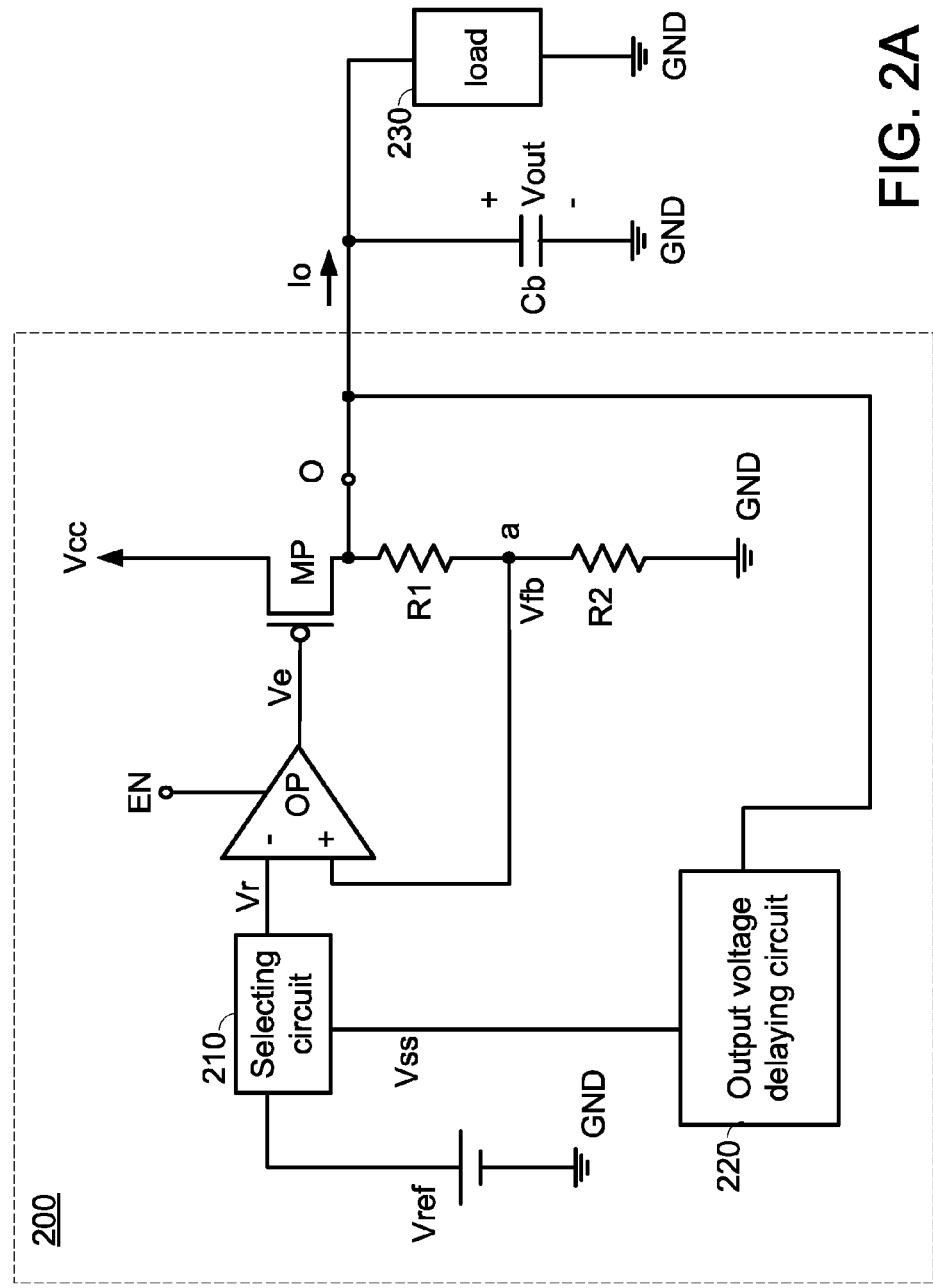
FIG. 2A is a schematic circuit diagram illustrating a voltage regulator according to an embodiment of the present invention.
Figure 2B:
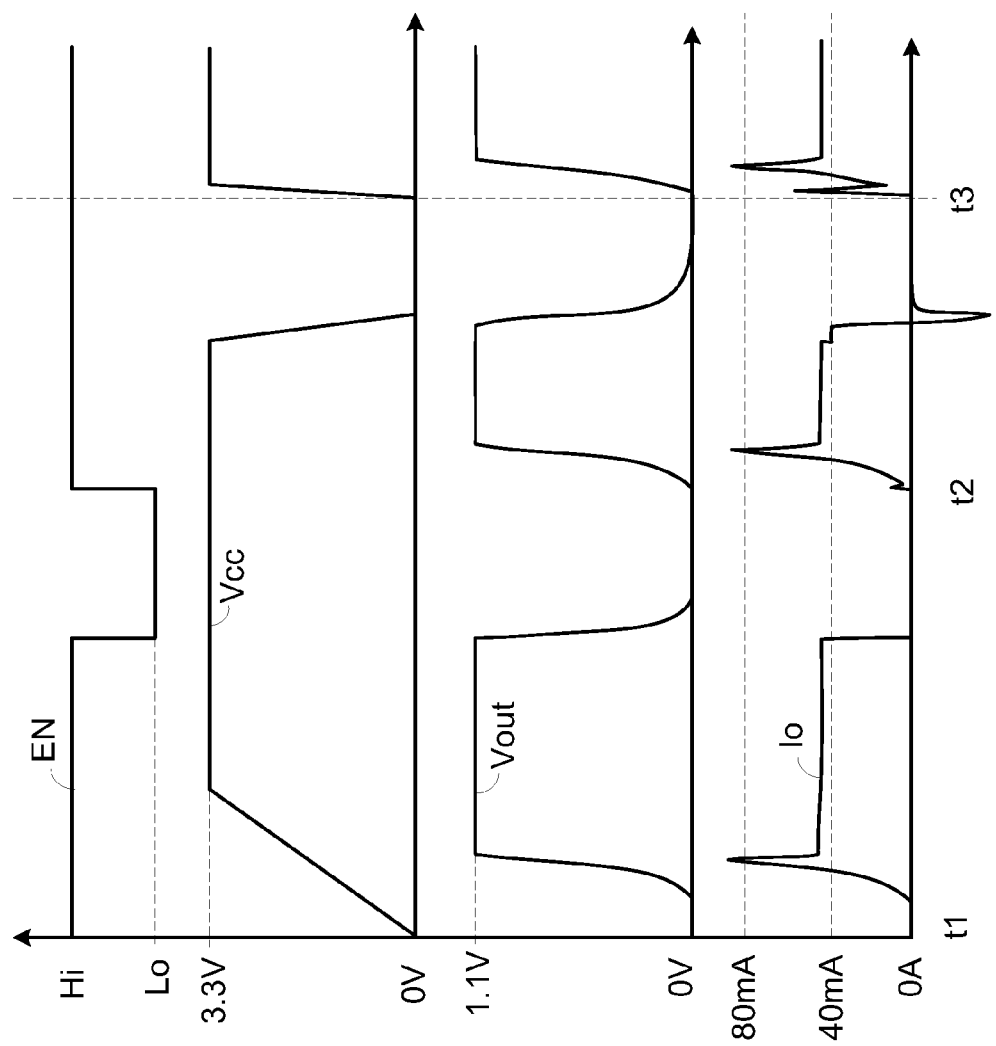
FIG. 2B is a schematic timing waveform diagram illustrating associated signals processed by the voltage regulator of FIG. 2A.

FIG. 2A is a schematic circuit diagram illustrating a voltage regulator according to an embodiment of the present invention. FIG. 2B is a schematic timing waveform diagram illustrating associated signals processed by the voltage regulator of FIG. 2A. The voltage regulator 200 comprises a reference voltage source, a selecting circuit 210, a transistor MP, an operational amplifier OP, an output voltage delaying circuit 220, a first resistor R1 and a second resistor R2. Moreover, a soft-start circuit is defined by the selecting circuit 210 and the output voltage delaying circuit 220 collaboratively.

In this embodiment, the two input terminals of the selecting circuit 210 receive a reference voltage Vref from the reference voltage source and a delayed output voltage Vss from the output voltage delaying circuit 220. Moreover, a control voltage Vr is outputted from an output terminal of the selecting circuit 210. If the reference voltage Vref is larger than the delayed output voltage Vss, the selecting circuit 210 selects the delayed output voltage Vss as the control voltage Vr. Whereas, if the reference voltage Vref is smaller than the delayed output voltage Vss, the selecting circuit 210 selects the reference voltage Vref as the control voltage Vr.

The operational amplifier OP of the voltage regulator 200 is controlled according to an enabling signal EN. A negative input terminal of the operational amplifier OP receives the control voltage Vr. A positive input terminal of the operational amplifier OP receives a feedback voltage Vfb. An output terminal of the operational amplifier OP generates an error signal Ve. The gate terminal of the transistor MP is connected to the output terminal of the operational amplifier OP. The source terminal of the transistor MP is connected to a power supply voltage Vcc. The drain terminal of the transistor MP is connected to an output terminal O of the voltage regulator 200. Moreover, a first terminal of the first resistor R1 is connected to the drain terminal of the transistor MP, and a second terminal of the first resistor R1 is connected to a node "a". A first terminal of the second resistor R2 is connected to the node "a", and a second terminal of the second resistor R2 is connected to a ground voltage GND. Moreover, the feedback voltage Vfb is outputted from the node "a", and the node "a" is connected to the positive input terminal of the operational amplifier OP. Moreover, the output voltage delaying circuit 220 is connected between the output terminal O of the voltage regulator 200 and the selecting circuit 210. The output voltage delaying circuit 220 may receive an output voltage Vout from the output terminal O of the voltage regulator 200 and generate the delayed output voltage Vss to the selecting circuit 210.

The output terminal O of the voltage regulator 200 is connected to a bulk capacitor Cb and a load 230. While the voltage regulator 100 is normally operated, the transistor MP is controlled to generate the output voltage Vout according to the error signal Ve. Moreover, the output voltage Vout from the voltage regulator 200 is stabilized by the bulk capacitor Cb. Consequently, the output terminal O of the voltage regulator 200 generates an output current Io to the load 230. Under this circumstance, the output voltage Vout may be expressed by the following formula:

$$Vout=(1+R1/R2)\times Vref.$$

In accordance with a feature of the present invention, during the transient period of starting up the voltage regulator 200, the voltage difference between the two input terminals of the operational amplifier OP is reduced according to the control voltage Vr from the soft-start circuit. Consequently, the possibility of generating the overshoot phenomenon of the output voltage Vout is minimized.

In other words, during the transient period of starting up the voltage regulator 200, the magnitudes of the output voltage Vout and the feedback voltage Vfb are very small. Meanwhile, the selecting circuit 210 selects the delayed output voltage Vss as the control voltage Vr, and the delayed output voltage Vss is inputted into the negative input terminal of the operational amplifier OP. Consequently, the positive input terminal and the negative input terminal of the operational amplifier OP receive the feedback voltage Vfb and the delayed output voltage Vss, respectively. Since the voltage difference between the two input terminals of the operational amplifier OP is smaller, the overshoot phenomenon of the output voltage Vout and the rush current can be effectively inhibited.

Moreover, after the transient period of starting up the voltage regulator 200, if the delayed output voltage Vss is larger than the reference voltage Vref, the selecting circuit 210 selects the reference voltage Vref as the control voltage Vr, and the reference voltage Vref is inputted into the negative input terminal of the operational amplifier OP. Since the positive input terminal and the negative input terminal of the operational amplifier OP receive the feedback voltage Vfb and the delayed output voltage Vss, respectively, the output terminal O of the voltage regulator 200 can generate the stable output voltage Vout.

Please refer to FIG. 2B. At the time point t1, the voltage regulator 200 is started. The high level state of the enabling signal EN indicates that the operational amplifier OP is in a normal working state. Consequently, the power supply voltage Vcc increases at a ramp rate. Obviously, during the period of increasing the power supply voltage Vcc, no overshoot phenomenon of the output voltage Vout occurs. Moreover, the peak value of the output current Io is about 90 mA.

At the time point t2, the power supply voltage Vcc is in the steady state (e.g. 3.3V), and the enabling signal EN is switched from a low level state to the high level state. Obviously, during the transient period of enabling the operational amplifier OP, no overshoot phenomenon of the output voltage Vout occurs. Moreover, the peak value of the output current Io is about 90 mA.

At the time point t3, the enabling signal EN is in the high level state. Consequently, the power supply voltage Vcc quickly increases from 0V to 3.3V. Obviously, during the transient period of starting up the voltage regulator 200, no overshoot phenomenon of the output voltage Vout occurs. Moreover, the peak value of the output current Io is about 90 mA.

From the above descriptions, the soft-start circuit is defined by the selecting circuit 210 and the output voltage delaying circuit 220 collaboratively. During the transient period of starting up the voltage regulator 200, the soft-start circuit is capable of effectively reducing the output current Io from the voltage regulator 200 and avoiding the generation of the overshoot phenomenon of the output voltage Vout.

Figure 3A:
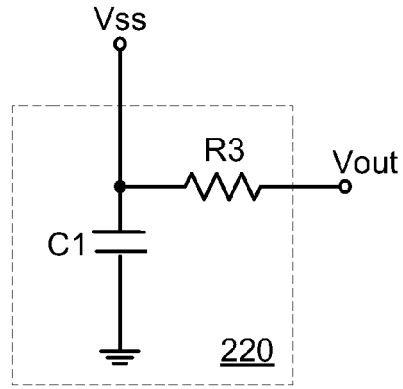
FIGS. 3A and 3B schematically illustrate two examples of the output voltage delaying circuit used in the voltage regulator of the present invention.
Figure 3B:
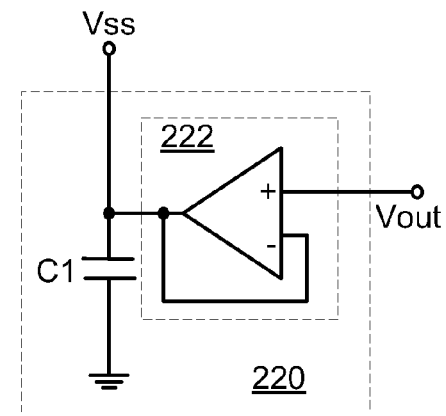

FIGS. 3A and 3B schematically illustrate two examples of the output voltage delaying circuit used in the voltage regulator of the present invention.

As shown in FIG. 3A, the output voltage delaying circuit 220 comprises a third resistor R3 and a capacitor C1. A first terminal of the third resistor R3 receives the output voltage Vout. A second terminal of the third resistor R3 is connected to a first terminal of the capacitor C1. A second terminal of the capacitor C1 is connected to the ground voltage GND. Moreover, the second terminal of the third resistor R3 generates the delayed output voltage Vss to the selecting circuit 210. In this embodiment, the delayed time of the output voltage delaying circuit 220 is determined according to the time constant of the RC circuit (i.e. R3×C1). If the delayed time is longer, the output voltage Vout increases at a slower rate during the transient start-up period and the possibility of generating the overshoot phenomenon of the output voltage Vout decreases. On the other hand, if the delayed time is shorter, the output voltage Vout increases at a faster rate during the transient start-up period and the possibility of generating the overshoot phenomenon of the output voltage Vout increases.

As shown in FIG. 3B, the output voltage delaying circuit 220 comprises a unity gain buffer 222 and a capacitor C1. An input terminal of the unity gain buffer 222 receives the output voltage Vout. An output terminal of the unity gain buffer 222 is connected to a first terminal of the capacitor C1. A second terminal of the capacitor C1 is connected to the ground voltage GND. Moreover, an output terminal of the unity gain buffer 222 generates the delayed output voltage Vss to the selecting circuit 210. In this embodiment, the delayed time of the output voltage delaying circuit 220 is determined according to the driving strength of the unity gain buffer 222. If the driving strength is weaker, the output voltage Vout increases at a slower rate during the transient start-up period and the possibility of generating the overshoot phenomenon of the output voltage Vout decreases. On the other hand, if the driving strength is stronger, the output voltage Vout increases at a faster rate during the transient start-up period and the possibility of generating the overshoot phenomenon of the output voltage Vout increases. In this embodiment, the unity gain buffer 222 is implemented by an operational amplifier. In addition, the negative input terminal and the output terminal of the operational amplifier are connected with each other.

Figure 4A:
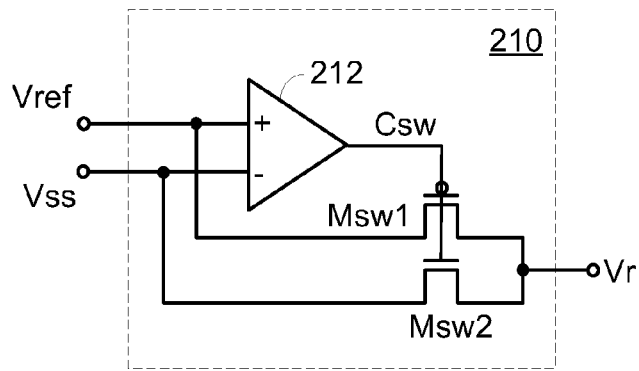
FIGS. 4A and 4B schematically illustrate two examples of the selecting circuit used in the voltage regulator of the present invention.
Figure 4B:
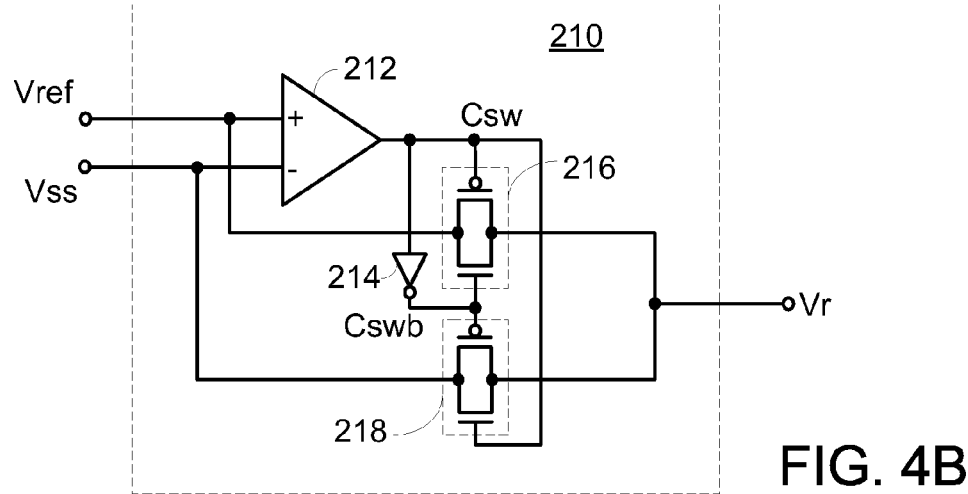

FIGS. 4A and 4B schematically illustrate two examples of the selecting circuit used in the voltage regulator of the present invention.

As shown in FIG. 4A, the selecting circuit 210 comprises a comparator 212, a first switching element Msw1 and a second switching element Msw2. A positive input terminal of the comparator 212 receives the reference voltage Vref. A negative input terminal of the comparator 212 receives the delayed output voltage Vss. An output terminal of the comparator 212 generates a switching signal Csw. A control terminal of the first switching element Msw1 receives the switching signal Csw. A first terminal of the first switching element Msw1 is connected to the positive input terminal of the comparator 212. A control terminal of the second switching element Msw2 receives the switching signal Csw. A first terminal of the second switching element Msw2 is connected to the negative input terminal of the comparator 212. A second terminal of the second switching element Msw2 is connected to a second terminal of the first switching element Msw1. In this embodiment, the first switching element Msw1 is a P-type transistor, and the second switching element Msw2 is an N-type transistor.

Obviously, if the reference voltage Vref is larger than the delayed output voltage Vss, the switching signal Csw is in a high level state. Under this circumstance, the second switching element Msw2 is in a close state, and the first switching element Msw1 is in an open state. Consequently, the selecting circuit 210 selects the delayed output voltage Vss as the control voltage Vr. On the other hand, if the reference voltage Vref is smaller than the delayed output voltage Vss, the switching signal Csw is in a low level state. Under this circumstance, the first switching element Msw1 is in the close state, and the second switching element Msw2 is in the open state. Consequently, the selecting circuit 210 selects the reference voltage Vref as the control voltage Vr.

As shown in FIG. 4B, the selecting circuit 210 comprises a comparator 212, an inverter 214, a first transmission gate 216 and a second transmission gate 218. A positive input terminal of the comparator 212 receives the reference voltage Vref. A negative input terminal of the comparator 212 receives the delayed output voltage Vss. An output terminal of the comparator 212 generates a switching signal Csw. The inverter 214 receives the switching signal Csw and generates an inverted switching signal Cswb. A first control terminal of the first transmission gate 216 receives the switching signal Csw, and a second control terminal of the first transmission gate 216 receives the inverted switching signal Cswb. A first terminal of the first transmission gate 216 is connected to the positive input terminal of the comparator 212. A first control terminal of the second transmission gate 218 receives the inverted switching signal Cswb, and a second control terminal of the second transmission gate 218 receives the switching signal Csw. A first terminal of the second transmission gate 218 is connected to the negative input terminal of the comparator 212. A second terminal of the second transmission gate 218 is connected to a second terminal of the first transmission gate 216.

Obviously, if the reference voltage Vref is larger than the delayed output voltage Vss, the switching signal Csw is in a high level state and the inverted switching signal Cswb is in a low level state. Under this circumstance, the second transmission gate 218 is in a close state, and the first transmission gate 216 is in an open state. Consequently, the selecting circuit 210 selects the delayed output voltage Vss as the control voltage Vr. On the other hand, if the reference voltage Vref is smaller than the delayed output voltage Vss, the switching signal Csw is in the low level state and the inverted switching signal Cswb is in the high level state. Under this circumstance, the first transmission gate 216 is in the close state, and the second transmission gate 218 in the open state. Consequently, the selecting circuit 210 selects the reference voltage Vref as the control voltage Vr.

It is noted that numerous modifications and alterations of the selecting circuit 210 may be made while retaining the teachings of the invention. For example, in some other embodiments, the positive input terminal of the comparator 212 receives the delayed output voltage Vss, the negative input terminal of the comparator 212 receives the reference voltage Vref, and the output terminal of the comparator 212 generates the switching signal Csw. Moreover, the connecting relationship between the switching elements or the transmission gates may be modified while achieving the function of the selecting circuit 210.

From the above descriptions, the present invention provides a voltage regulator with a soft-start circuit. The soft-start circuit is capable of effectively reducing the output current Io and avoiding the generation of the overshoot phenomenon of the output voltage Vout during the transient period of starting up the voltage regulator.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voltage regulator, comprising:
    an operational amplifier, wherein a first input terminal of the operational amplifier receives a control voltage, a second input terminal of the operational amplifier receives a feedback voltage, and an output terminal of the operational amplifier generates an error signal;
    a transistor, wherein a gate terminal of the transistor is connected to the output terminal of the operational amplifier and receives the error signal, a first terminal of the transistor receives a power supply voltage, and a second terminal of the transistor is connected to an output terminal of the voltage regulator, wherein the output terminal of the voltage regulator generates an output voltage;
    a first resistor, wherein a first terminal of the first resistor is connected to the output terminal of the voltage regulator, and a second terminal of the first resistor is connected to the second input terminal of the operational amplifier;
    a second resistor, wherein a first terminal of the second resistor is connected to the second terminal of the first resistor and generates the feedback voltage, and a second terminal of the second resistor is connected to a ground voltage;
    an output voltage delaying circuit connected to the output terminal of the voltage regulator, wherein the output voltage delaying circuit receives the output voltage and generates a delayed output voltage; and
    a selecting circuit, wherein a first input terminal of the selecting circuit receives a reference voltage, a second input terminal of the selecting circuit receives the delayed output voltage, and an output terminal of the selecting circuit generates the control voltage to the first input terminal of the operational amplifier,
    wherein if the reference voltage is larger than the delayed output voltage, the selecting circuit selects the delayed output voltage as the control voltage, wherein if the reference voltage is smaller than the delayed output voltage, the selecting circuit selects the reference voltage as the control voltage.

2. The voltage regulator as claimed in claim 1, wherein the output terminal of the voltage regulator is further connected to a bulk capacitor and a load.

3. The voltage regulator as claimed in claim 1, wherein the output voltage delaying circuit comprises:
    a third resistor, wherein a first terminal of the third resistor is connected to the output terminal of the voltage regulator and receives the output voltage; and
    a first capacitor, wherein a first terminal of the first capacitor is connected to a second terminal of the third resistor and generates the delayed output voltage, and a second terminal of the first capacitor is connected to the ground voltage.

4. The voltage regulator as claimed in claim 1, wherein the output voltage delaying circuit comprises:
    a unity gain buffer, wherein an input terminal of the unity gain buffer is connected to the output terminal of the voltage regulator and receives the output voltage; and
    a first capacitor, wherein a first terminal of the first capacitor is connected to an output terminal of the unity gain buffer and generates the delayed output voltage, and a second terminal of the first capacitor is connected to the ground voltage.

5. The voltage regulator as claimed in claim 1, wherein the selecting circuit comprises:
    a comparator, wherein a first input terminal of the comparator receives the reference voltage, a second input terminal of the comparator receives the delayed output voltage, and an output terminal of the comparator generates a switching signal;
    a first switching element, wherein a control terminal of the first switching element receives the switching signal, and a first terminal of the first switching element is connected to the first input terminal of the comparator and receives the reference voltage; and
    a second switching element, wherein a control terminal of the second switching element receives the switching signal, a first terminal of the second switching element is connected to the second input terminal of the comparator and receives the delayed output voltage, and a second terminal of the second switching element is connected to a second terminal of the first switching element and generates the control voltage.

6. The voltage regulator as claimed in claim 5, wherein if the reference voltage is larger than the delayed output voltage, the first switching element is in an open state and the second switching element is in a close state, so that the selecting circuit selects the delayed output voltage as the control voltage, wherein if the reference voltage is smaller than the delayed output voltage, the first switching element is in the close state and the second switching element is in the open state, so that the selecting circuit selects the reference voltage as the control voltage.

7. The voltage regulator as claimed in claim 5, wherein the first switching element is a P-type transistor, and the second switching element is an N-type transistor.

8. The voltage regulator as claimed in claim 1, wherein the selecting circuit comprises:
- a comparator, wherein a first input terminal of the comparator receives the reference voltage, a second input terminal of the comparator receives the delayed output voltage, and an output terminal of the comparator generates a switching signal;
- an inverter, wherein an input terminal of the inverter receives the switching signal, and an output terminal of the inverter generates an inverted switching signal;
- a first transmission gate, wherein a first control terminal of the first transmission gate receives the switching signal, a second control terminal of the first transmission gate receives the inverted switching signal, and a first terminal of the first transmission gate is connected to the first input terminal of the comparator and receives the reference voltage; and
- a second transmission gate, wherein a first control terminal of the second transmission gate receives the inverted switching signal, a second control terminal of the second transmission gate receives the switching signal, a first terminal of the second transmission gate is connected to the second input terminal of the comparator and receives the delayed output voltage, and a second terminal of the second transmission gate is connected to a second terminal of the first transmission gate and generates the control signal.

9. The voltage regulator as claimed in claim 8, wherein if the reference voltage is larger than the delayed output voltage, the first transmission gate is in an open state and the second transmission gate is in a close state, so that the selecting circuit selects the delayed output voltage as the control voltage, wherein if the reference voltage is smaller than the delayed output voltage, the first transmission gate is in the close state and the second transmission gate is in the open state, so that the selecting circuit selects the reference voltage as the control voltage.

10. The voltage regulator as claimed in claim 1, wherein the operational amplifier further has an enabling terminal receiving an enabling signal, wherein the operational amplifier is operated according to the enabling signal.

* * * * *